United States Patent [19]

Wills

[11] Patent Number: 5,051,049
[45] Date of Patent: Sep. 24, 1991

[54] STICKY NUT FASTENER

[76] Inventor: Kevin P. Wills, 550 E. Main St., Barrington, Ill. 60010

[21] Appl. No.: 604,202

[22] Filed: Oct. 29, 1990

[51] Int. Cl.$^5$ .................... F16B 37/08; F16B 39/00
[52] U.S. Cl. ............................. 411/258; 411/165; 411/432; 411/533
[58] Field of Search ............... 411/82, 258, 163–165, 411/432, 533, 368, 369, 442–444; 206/343, 345, 346

[56] References Cited

U.S. PATENT DOCUMENTS

| | | | |
|---|---|---|---|
| 2,576,906 | 11/1951 | Poupitch | 411/165 |
| 2,679,880 | 6/1954 | Poupitch | 411/165 |
| 2,775,917 | 1/1957 | Ferguson | 411/258 |
| 3,828,925 | 8/1974 | Magyar et al. | 206/346 |
| 3,855,383 | 12/1974 | Dahlgren | 411/165 |

Primary Examiner—Neill R. Wilson
Attorney, Agent, or Firm—Charles F. Meroni, Jr.

[57] ABSTRACT

An elongated strip of adhesively attached preassembled lock washer and nut assemblies for attachment to threaded shanks of bolts for joining members together. The strip has a strip face provided with a peelable type adhesive. A series of lock nuts each having a star washer in unitary assembly therewith. An adhesive ring with opposite faces of the adhesive ring each provided with a peelable type adhesive material with one face being retainingly secured by the adhesive to the lock nut and with the other and opposite face being secured by the peelable type adhesive to the adhesive on the strip. The lock nuts are adhesively secured in spaced relation to the strip along the length thereof in readiness for each lock nut to be peeled free of the strip for attachment to a member by the adhesive material for assembly therewith.

15 Claims, 4 Drawing Sheets

STICKY NUT FASTENER

FIELD OF THE INVENTION

The present invention concerns a sticky nut that is used to facilitate the simple assembly and disassembly of parts to be joined together. According to my invention, when a thin protective film layer is removed from an outer side of the sticky nut, a sticky adhesive on a synthetic plastic ring on the sticky nut becomes exposed. The exposed sticky adhesive sticky nut can now be set against the assembly surface or plate by pulling back on a bolt preferably after the threads on the bolt and the nut are engaged together and the threading action has commenced. After the sticky or adhesive ring has been set, the bolt can be tightened, and locked, without the use of a holding wrench on the sticky nut. Upon disassembly of the bolt from the adhesive or sticky nut, the sticky nut remains mounted in position on the plate to allow simple re-assembly of the bolt.

There is prior art that relates broadly to the use of adhesive for securing a washer by a coating of an adhesive to a part and attention is directed to U.S. Pat. No. 2,235,078. Other patents that are known and which are known include the following:

| INVENTOR'S NAME | TITLE OF PATENT | U.S. Pat. No. |
|---|---|---|
| G. E. Moore | Cementitious Anchorable Hanger Support | 2,385,296 |
| Kenneth V. Cushman | Encapsulated Floating and Nonfloating Fasteners | 3,646,982 |
| Joseph Perina | Self-Locking System | 3,658,107 |
| Charles E. Gutshall | Panel Insert Device | 3,678,980 |

According to my invention, I have provided a synthetic plastic ring having opposed peelable adhesive on opposite sides to hold the nut in place against a plate so that only one tool or wrench is needed. The sticky adhesive ring has sticky surfaces on opposite sides thus allowing the ring member to be attached on one side to the nut and on another side to a surface or metal plate to which the nut is to be attached.

The prior art does contemplate the use of sticky surfaces for use on lock washers for attaching a lock washer to a nut (FIG. 4) or to a bolt (FIG. 1 and 2) of expired U.S. Pat. No. 1,874,462. In expired U.S. Pat. No. 2,235,078, the patentee shows how a washer 2 can be secured by a coating of adhesive 8 to a part 6. The prior art does not utilize a ring member having sticky surfaces on opposite sides that can be readily made available for use by removing or peeling away the protective layers to expose the sticky surfaces to permit the part or ring to be readily attached to a "keps" nut by one sticky or adhesive surface and then to a plate or member by another sticky adhesive surface.

Expired U.S. Pat. No. 2,385,296 shows the use of another type of device and more specifically an "anchorable hanger" 40 having a welded base plate 11, that is secured to a supporting surface 10 by means of a cement which is generally indicated at A.

Expired U.S. Pat. No. 3,646,982 shows another type of fastener called a floating fastener (see column 1, lines 33 etc.) where the fastener is encapsulated in a molded plastic material, and where the molded plastic material is bonded to a supporting surface 63. The bonding adhesive is described as being of an epoxy type, where the patentee further states that pressure sensitive types can be used as shown surface 35 (see column 3, lines 14-16).

Expired U.S. Pat. No. 3,678,980, shows several different types of retaining elements, such an annular body 16a (FIG. 9), which is secured to a skin sheet 34 by means of a thermoplastic adhesive material which, when subjected to heat, will establish a chemical bond.

SUMMARY OF THE INVENTION

According to certain features of my invention I have provided an elongated strip of adhesively attached pre-assembled lock washers and nut assemblies for attachment to threaded shanks of bolts for joining members together. The strip has a strip face provided with a peelable type adhesive. A series of lock nuts each has a star washer in unitary assembly therewith. An adhesive ring with opposite faces of the adhesive ring being each provided with a peelable type adhesive material with one face being retainingly secured by the adhesive to the lock nut and with the other and opposite face being secured by the peelable type adhesive to the adhesive on the strip. The lock nuts are adhesively secured in spaced relation to the strip along the length thereof in readiness for each lock nut to be peeled free of the strip for attachment to a member by the adhesive material for assembly therewith.

Other and further features of my invention concern a new combination which includes a pre-assembled lock washer and nut assembly, and at least one metal plate to be secured with the said assembly. The assembly includes a nut, and a star washer integrally fastened to the nut by a screw thread from the nut. An adhesive ring is provided with adhesive on axially opposite faces of the adhesive ring, the adhesive on one face joining the ring to the washer, the adhesive on an opposite face of the adhesive ring joining the nut to at least one plate. The bolt and nut being operable for drawing the nut and for drawing the star washer in embedded assembly with a confronting face of the metal plate so that biting edges on the star washer can actively bite into the confronting face of the metal plate to further resist rotative action of the adhesive lock nut as the bolt is screwed tightly into the nut.

According to still other features of my invention, the biting edges on the washer penetrate through the ring and into the face surface of the at least one metal plate when the bolt is turned into tight assembly with the nut.

Yet other features concern the ring on each lock nut being comprised of an acrylic foam that is coated on both sides with a firm acrylic adhesive, the ring being 0.15" thick.

Still other features of my invention concern the ring being comprised of an acrylic foam, the foam having a density of 50 lb./ft.3 and having an approximate thickness of 0.015".

While my new and improved pre-assembled lock washer and nut assembly including my adhesive ring have been illustrated for use in connection with being attached with at least one or more metal plates, it should also be understood that other articles may be joined together other than metal plates while still practicinq the principles of my invention. As an example, an article could be attached to an interior panel in an automotive application by using my so-called sticky nut fastener.

DETAILED DESCRIPTION OF THE DRAWINGS

Figure 1:
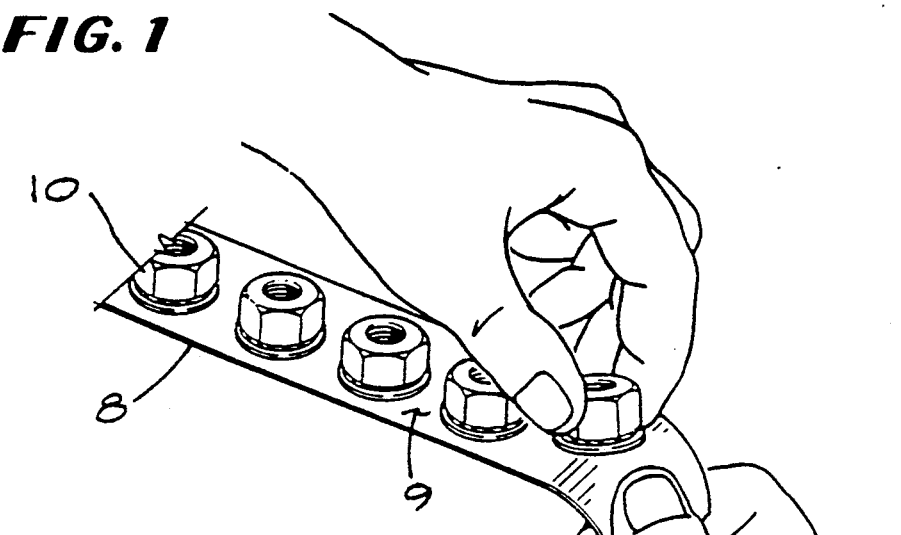
FIG. 1 is a diagramatic view of a strip of adhesive lock nuts or "Keps" nuts showing how the lock nut can be manipulated so as to be peeled from the strip for reattachment to another surface.

In FIG. 1, I have designated a paper or film strip by the reference numeral 8. The strip 8 has a waxed adhesive surface indicated at 9. Mounted on the strip is a series of adhesive lock washer and nuts 10 also well known in the U.S.A. as "Keps" nuts . The mark "Keps" is a registered trademark in the U.S.A. owned by Illinois Tool Works, Inc. Each of the adhesive lock nuts 10 or "Keps" nuts includes a nut 11, a washer 12 which is preferably a so called star washer and an adhesive ring 13. The so called "Keps" nut 10 is sold under the tradename "Keps" and nuts of this general type are well-known in industry. A so called "Keps" nut 10 is of the type where the washer 12 and the nut are joined together in such a way that a thread of the nut 11 extends exteriorly of the nut and is bent radially outwardly over an outer circular face of the washer 12 in a press to secure the washer 12 to the nut 11 in unitary assembly therewith. The washer 12 and the nut 11 can ordinarily revolve relative to one another and together constitute a one-piece assembly.

The adhesive ring 13 preferably comprises a double-coated acrylic foam tape type 4920 as manufactured and sold by 3M Industrial Specialties Division, 3M Center Building 220-7E01, St. Paul, Minn. 55144,1000. The tape comes from a so called an A-30 Acrylic Adhesive Family. More specifically, the ring 13 is an acrylic foam coated on both sides with a firm acrylic adhesive. This product is 0.015" thick making it suitable for applications where a thin bond line is required. 4920 is suitable for use in many interior and exterior industrial applications.

| Typical physical properties (ASTM Test Methods) | |
|---|---|
| Approximate Foam Density: | |
| lb./ft.$^3$ | 50 |
| kg/m$^3$ | 800 |
| Approximate Thickness: | |
| inches | 0.015 |
| mm | .04 |
| VHB Joining Systems (Very High Bond) | |
| Pressure sensitive; bond increases under pressure, overtime. | |
| Heat Range: | |
| Applicable at 32° F. - up to 300° F. short term, 200° F. long term. | |

Cooperable with the adhesive lock nut 10 is a bolt indicated generally at 14. The bolt 14 and the "Keps" nut 10 are adapted to cooperate together for the purpose of securing a pair of metallic members or plates 15 and 16 together as seen in FIGS. 2-8, inclusive.

Figure 2:
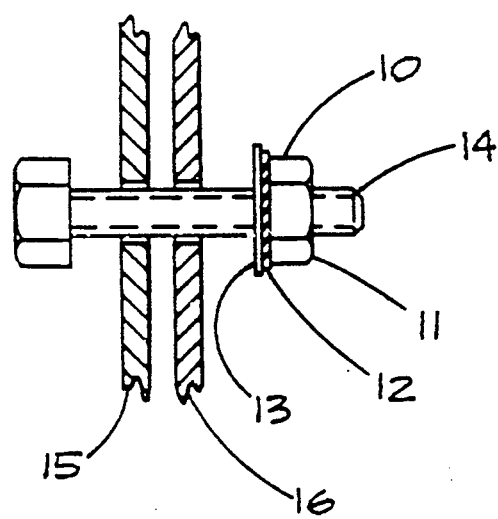
FIG. 2 is an enlarged fragmentary section with parts in elevation illustrating the manner of use of my adhesive lock nut for securing a pair of members together.
Figure 8:
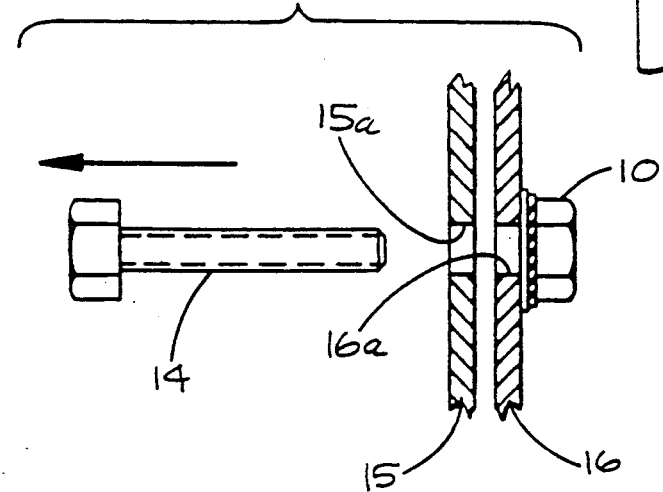
FIG. 8 is an exploded view of the component shown in FIG. 6 with the plates shown in section and the nut and bolt shown in elevation for the purpose of illustrating how the adhesive functions to retain the adhesive lock nut in firm assembly with the member or plate.

It is part of my invention to provide a new and improved strip of adhesive lock nuts as illustrated in FIG. 1. The user can remove the adhesive lock nuts 10 on a one-at-a-time basis from the strip 8 as shown. Thus, the nuts 10 can be removed, as needed, merely by peeling away the end of the strip 8 by grasping the end of the strip manually as shown in FIG. 1 and then causing the adhesive ring 13 to disengage from the waxed adhesive surface 9 on the strip 8. When the adhesive ring 13 is disengaged from the strip 8, it can then be telescoped over the shank of the bolt 14, as shown in FIG. 2. It will be observed that the plates 15 and 16 have a pair of openings 15a and 16a as seen in FIG. 8. When mounting the adhesive lock nut 10 on the threads of the bolt 14, the adhesive ring 13 should be axially aligned with a longitudinal axis extending through the opening 15a and 16a so that the adhesive ring 13 is properly centered relative to these holes 15a and 16a all as seen in FIG. 8.

Figure 3:
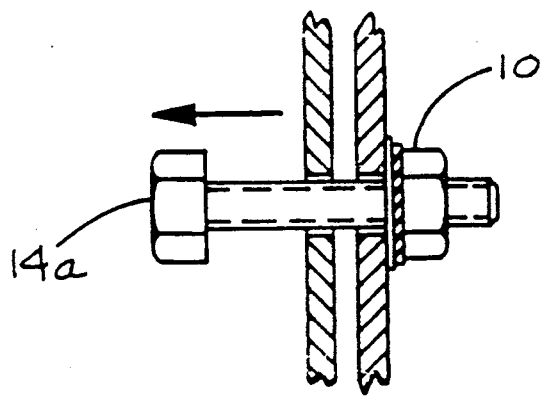
FIG. 3 is an enlarged fragmentary section similar to FIG. 2 only illustrating how the adhesive on the adhesive lock nut can be secured to one of the members or plates.

In order to set the adhesive lock nut 10 in place on the plate 16, it is necessary to manually grasp the bolt 14 and its head 14a and pull it in the direction indicated by the arrow shown in FIG. 3 and in this way the adhesive ring (FIGS. 2 and 3) on the 13 can be adhesively secured to a confronting face of the plate 16 about the hole 16a in the plate as illustrated in FIG. 8.

Before the adhesive lock nut 10 is adhered to the plate 16 as just described, it is necessary for a bolt shank 14b and its threads 14c to be engaged with the interior threads of the nut to insure that the bolt threads and the nut threads can be inter-engaged together. At this point in time, the adhesive lock mechanism can be manually grasped and engaged the plate 16 as previously described.

Figure 4:
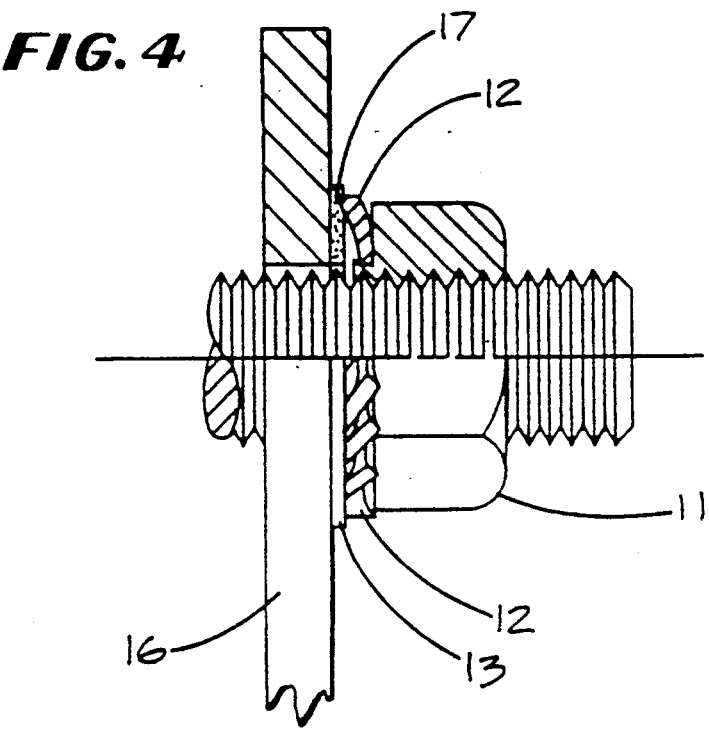
FIG. 4 is an enlarged fragmentary vertical section with parts shown in elevation illustrating the way in which washer edges penetrate the adhesive and become embedded in the opposed member or plate.

As will be seen in FIG. 4, before the nut 11 and the washer 12 are tightly secured, biting edges 17 on the washer 12 only partially penetrate into the material of the adhesive ring 13. Then once the wrench is applied and the bolt 11 is drawn into tight engagement with the nut 11, then the edges 17 penetrate into the material of the plate in biting engagement with the exterior plate surface. The edges 17 produce scratched surfaces as indicated at 18 showing the intensity of the gripping action between the biting edges 17 and the confronting face of the plate 16.

Figure 9:
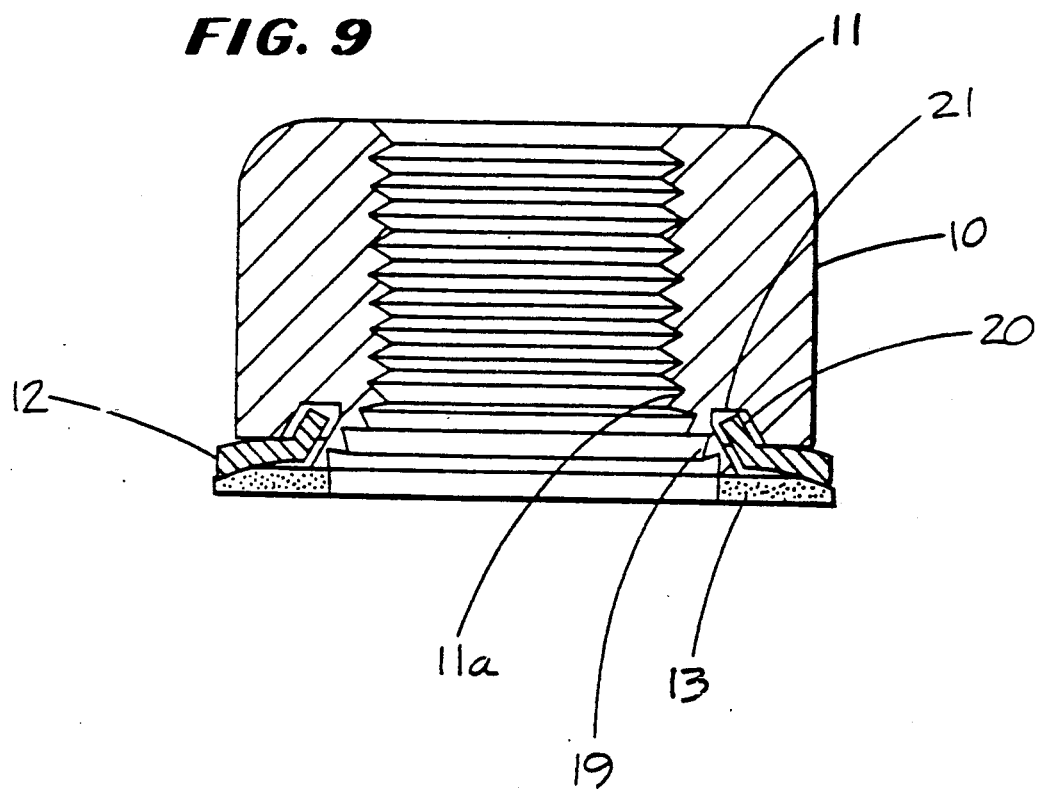
FIG. 9 is a vertical section of my pre-assembled lock washer and nut illustrating the way in which the nut thread serves to lock the washer in assembly with the nut.

In FIG. 9 another important relationship is illustrated which also embodies features of my invention. Here, it will be seen how nut threads 19 are turned radially outwardly into axially confronting engagement with a confronting face of the washer 12 to physically lock the washer to the nut 11 to form what is known as an external tooth lock washer nut otherwise known as a pre-assembled lock washer and nut assembly 10. The assembly 10 is sold under the trade name "Keps" as previously described. The normal "Keps" nut 10 is of such type that the washer 12 can either rotate relative to the nut 11 or the threads 19 can positive physically lock the washer in rigid engagement with the nut so as to insure that the nut and lock washer will co-rotate together.

The star washer 12 has a radially and axially inwardly inclined continuous annular seating tab 20 (FIG. 9) which is adapt to be engaged in a seating trough or groove formed in the nut 11 also illustrated in FIG. 9. In order to fixedly assemble the star washer 12 with the nut 11, the threads 19 are machine pressed and moved from a position where the threads are generally co-axial with the other threads through the nut 11 to position where these threads are extended radially and axially away from a central axis passing through the nut 11 all as illustrated in FIG. 9. Thus, the threads 19 physically bear against the continuous annual seating tab 20 on the star washer 12 to hold the star washer in assembly with the nut 11. Now by using my adhesive ring 13, according to important features of my invention, the ring can serve to lock the thread 19 with the confronting washer face of the washer 12 in the seating groove or trough 21 so that the nut and the washer will rotate together.

Figure 5:
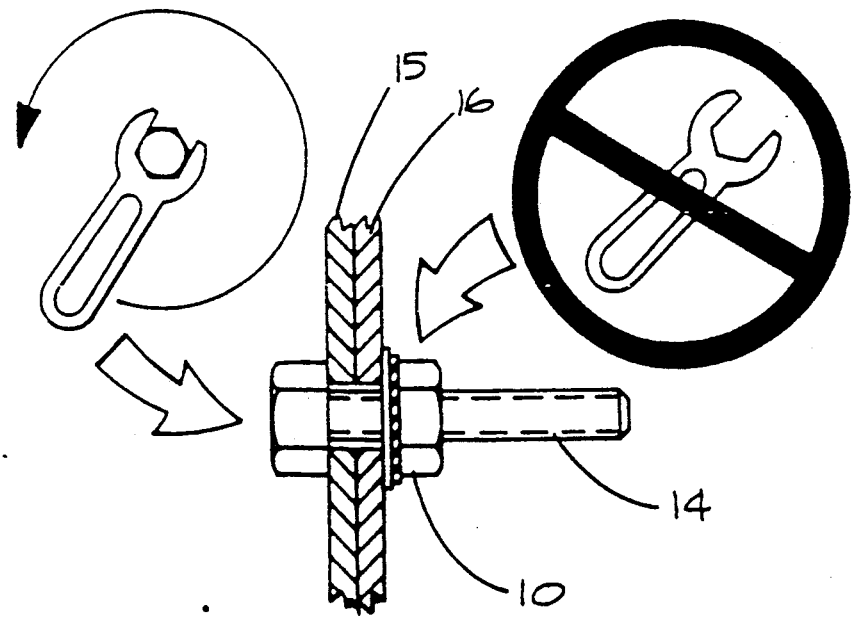
FIG. 5 is an enlarged vertical section with parts shown in elevation showing the manner in which a single wrench can be used to secure the bolt and nut assembly with the members or plates to be clamped together.
Figure 6:
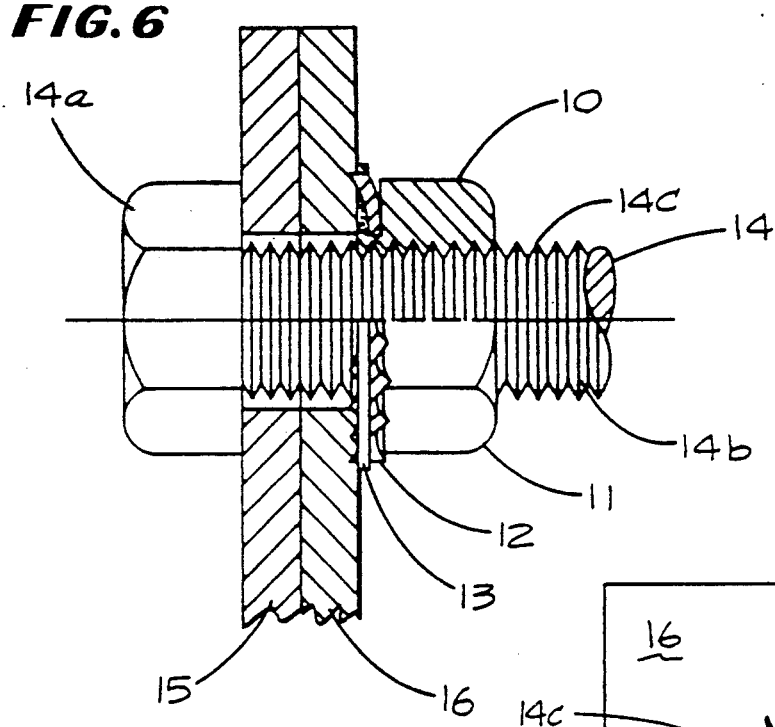
FIG. 6 is an enlarged fragmentary partially sectioned view similar to FIG. 4 only with the adhesive lock nut secured tightly in place and with the biting edges of the washer embedded in the member or plate.
Figure 7:
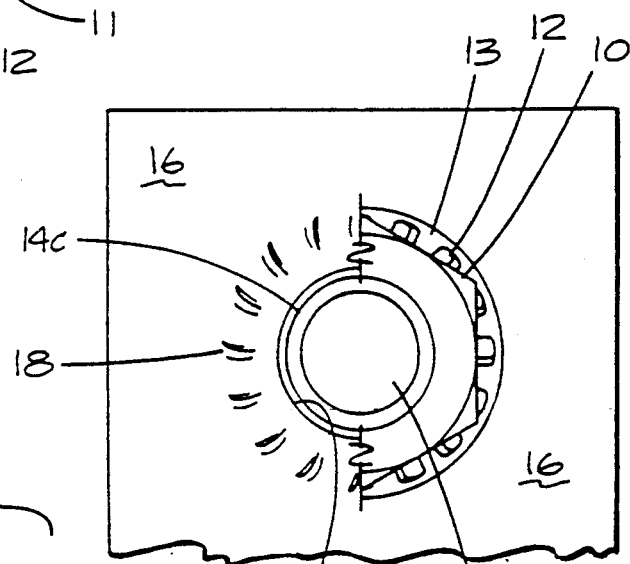
FIG. 7 is an enlarged fragmentary front view of the assemblage shown in FIG. 6 only with a portion of the adhesive lock nut broken away to illustrate the manner in which the biting edges of the washer on the lock nut bite into and scratch the member or plate when the nut is secured tightly with the bolt as shown in FIG. 6.

Once the adhesive lock nut is set in place on the plate 16, the nut can be drawn tight by a wrench as shown in FIGS. 4 and 5. If desired, the bolt 14 can be provided with a slot for receiving a "Phillips" type screwdriver so that the wrench or screwdriver can be used for securing the bolt to the nut 10 to clamp the members or plates 15 and 16 tightly together. In FIG. 5 it is observed that by providing lock nuts with an adhesive ring member 13 that it is no longer necessary to use a pair of wrenches for securing the bolt 14 and a adhesive lock nut 10 in firmly clamped assembly with the members of plates 15 and 16. It is now possible that a single tool or wrench can be used for tightly securing the "Keps" nut 10 in tight assembly to cause the plates 15 and 16 to be secured in clamped assembly.

I claim,

1. An elongated strip of adhesively attached preassembled lock washers and nut assemblies for attachment to threaded shanks of bolts for joining members together, the strip having a strip face provided with a peelable type adhesive, a series of lock nuts each having a star washer in unitary assembly therewith, an adhesive ring with opposite faces each provided with a peelable type adhesive material with one face being retainingly secured by the adhesive to said lock nut and with the other and opposite face being secured by the peelable adhesive to the peelable type adhesive on said strip, the lock nuts being adhesively secured in spaced relation to the strip along the length thereof in readiness for each lock nut to be peeled free of the strip for attachment to a member by the adhesive material for assembly therewith.

2. The strip of claim 1 wherein the ring on each lock nut is comprised of an acrylic foam coated on both sides with a firm acrylic adhesive.

3. The strip of claim 1 wherein the ring on each lock nut is comprised of an acrylic foam coated on both sides with a firm acrylic adhesive, the ring being 0.015" thick.

4. In combination, a pre-assembled lock washer and nut assembly, at least one metal plate to be secured with said assembly, the assembly including a nut, a star washer integrally fastened to the nut by a screw thread from the nut, and an adhesive ring provided with adhesive on axially opposite faces of the adhesive ring, the adhesive on one face joining the ring to said washer, the adhesive on an opposite face of the adhesive ring joining the nut to said at least one plate, said bolt and nut being operable for drawing the nut and for drawing the washer in embedded assembly with a confronting face of the metal plate so that biting edges on the star washer can actively bite into said confronting face of the metal plate to further resist rotative action of the adhesive lock nut as the bolt is screwed tightly into the nut.

5. The combination of claim 4 wherein the biting edges on said star washer penetrate through said ring and into the face surface of said at least one metal plate when said bolt is turned into tight assembly with said nut.

6. The combination of claim 4 wherein the ring on each lock nut is comprised of an acrylic foam coated on both sides with a firm acrylic adhesive.

7. The combination of adhesive lock nuts of claim 4 wherein the ring on each lock nut is comprised of an acrylic foam coated on both sides with a firm acrylic adhesive, the ring being 0.015" thick.

8. The combination of claim 4 wherein the ring is comprised of an acrylic foam, the foam having a density of 50 lb./ft. 3 and having an approximate thickness of 0.015", the ring being coated on both sides with a firm acrylic adhesive.

9. The combination of claim 4 wherein the ring is comprised of an acrylic foam, the foam having a density of 50 lb./ft. 3 and having an approximate thickness of 0.015".

10. In combination, a pre-assembled lock washer and nut assembly, a pair of metal plates to be secured together by said assembly, the assembly including a nut having an internal thread, a bolt with an external threaded portion threadingly engaged with the internal nut threads, a star washer fastened to the bolt by the external thread portion of the bolt, and an adhesive ring provided with an acrylic adhesive on axially opposite faces of the adhesive ring, the adhesive on one face joining the ring to said washer, the adhesive on an opposite face of the adhesive ring joining the nut to one of said plates in closest adjacency to said adhesive ring, said bolt and nut being operable for drawing the nut and for drawing the star washer in embedded assembly with a confronting face of the metal plate in closest adjacency so that biting edges on the star washer can actively bite through the adhesive ring into said confronting face of the metal plate to further resist rotative action of the nut as the bolt is screwed tightly into the nut.

11. The combination of claim 10 wherein the biting edges on said star washer penetrate through said ring and into the face surface of said at least one metal plate when said bolt is turned into tight assembly with said nut.

12. The combination of claim 10 wherein the ring on each lock nut is comprised of an acrylic foam, the ring being 0.015" thick.

13. The combination of claim 10 wherein the ring is comprised of an acrylic foam, the foam having a density of 50 lb./ft. 3 and having an approximate thickness of 0.015".

14. The combination of claim 10 wherein the nut has a groove, the star washer has an annular radially and axially inwardly extending seating tab extended in said groove, the nut having radially and axially outwardly extending threads locking the seating tab in said groove securing the washer and the nut in unitary assembly.

15. The combination of claim 14 further characterized by the adhesive ring adhesively secured to the nut and to the washer holding them against rotation relative to one another.

* * * * *